United States Patent

Zepnik et al.

[11] Patent Number: 5,622,382
[45] Date of Patent: Apr. 22, 1997

[54] ROLLOVER BAR FOR A MOTOR VEHICLE

[75] Inventors: Siegfried Zepnik, Niefern-Oeschelbronn; Bodo Homann, Heimsheim; Uwe Henn, Wimshein, all of Germany

[73] Assignee: Dr. Ing. h.c.F. Porsche AG, Weissach, Germany

[21] Appl. No.: 686,863

[22] Filed: Aug. 1, 1996

Related U.S. Application Data

[63] Continuation of Ser. No. 413,764, Mar. 30, 1995, abandoned.

[30] Foreign Application Priority Data

Apr. 8, 1994 [DE] Germany .................. 44 12 108.3

[51] Int. Cl.⁶ .................................................. B60R 21/13
[52] U.S. Cl. .................................... 280/756; 296/102
[58] Field of Search ........................ 280/756; 296/102, 296/193, 186

[56] References Cited

U.S. PATENT DOCUMENTS

| Re. 33,178 | 3/1990 | Ahlgerg | 280/756 |
|---|---|---|---|
| 3,658,358 | 4/1972 | Baker | 280/756 |
| 3,985,386 | 10/1976 | Woods . | |
| 4,148,504 | 4/1979 | Rushing . | |
| 4,900,058 | 2/1990 | Hobrecht | 280/756 |
| 5,070,717 | 12/1991 | Boyd et al. . | |
| 5,094,478 | 3/1992 | Pfanzeder et al. | 280/756 |
| 5,236,219 | 8/1993 | Jambor et al. | 280/756 |
| 5,339,667 | 8/1994 | Shah et al. . | |

FOREIGN PATENT DOCUMENTS

| 85 23 831.7 | 11/1985 | Germany . | |
|---|---|---|---|
| 4108878A1 | 9/1992 | Germany . | |
| 4-310448 | 11/1992 | Japan | 280/756 |

OTHER PUBLICATIONS

"Bedeutung der Prozeβsimulation beim Innenhochdruckumformen", Bänder Bleche Rohre Jan. 1992, pp. 26–28.

*Primary Examiner*—Kenneth R. Rice
*Attorney, Agent, or Firm*—Evenson McKeown Edwards & Lenahan, PLLC

[57] ABSTRACT

A rollover bar for a motor vehicle, particularly for a convertible, is disclosed which is made up at several mutually connected frame parts and is fastened on its exterior lower ends on the stationary vehicle body. For creating a rollover bar which, while its function is good, can be manufactured in a simple and low-cost manner, requires minimal mounting space and has a low weight, it is provided that the rollover bar comprises internal-high-pressure-formed frame parts.

15 Claims, 4 Drawing Sheets

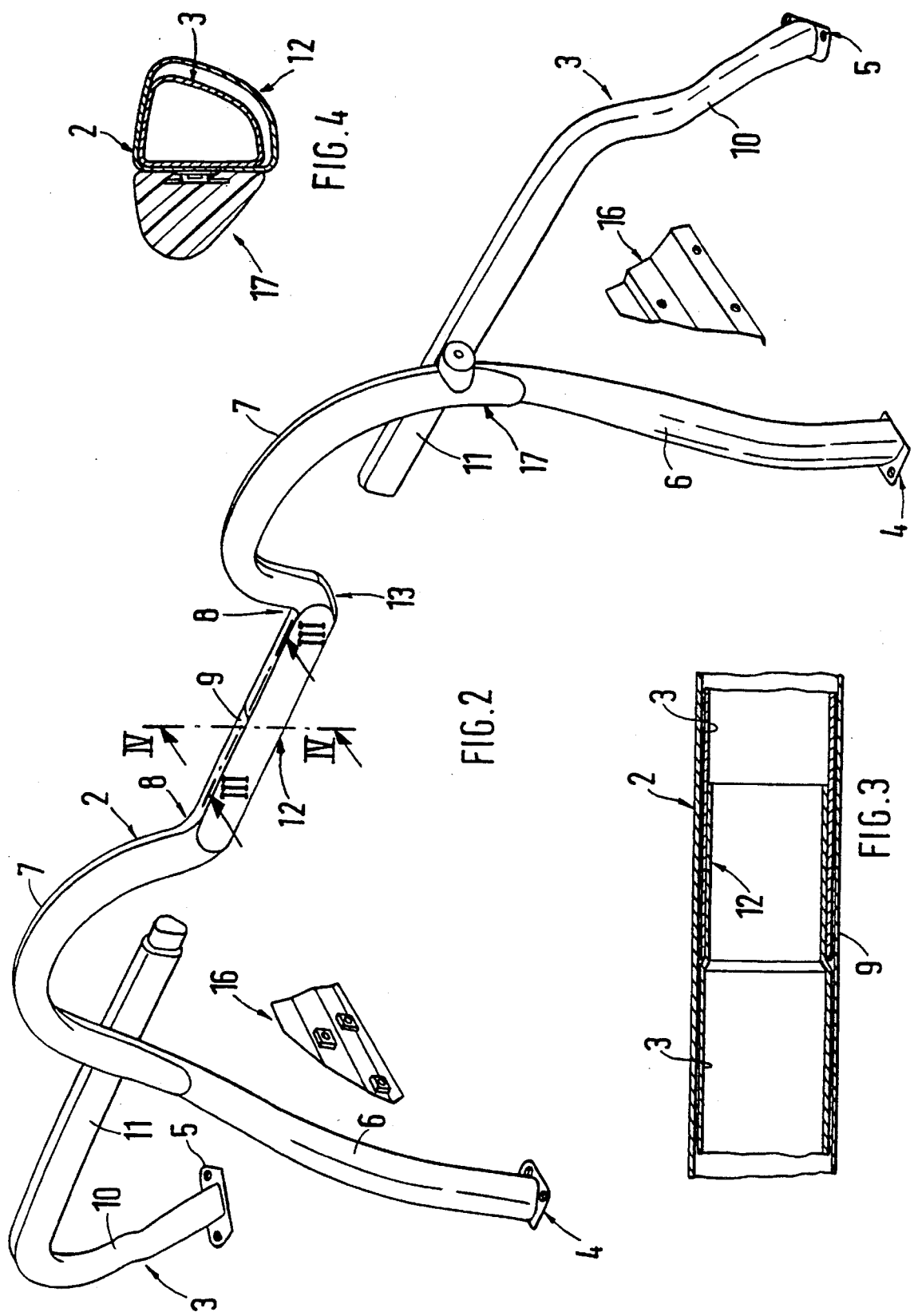

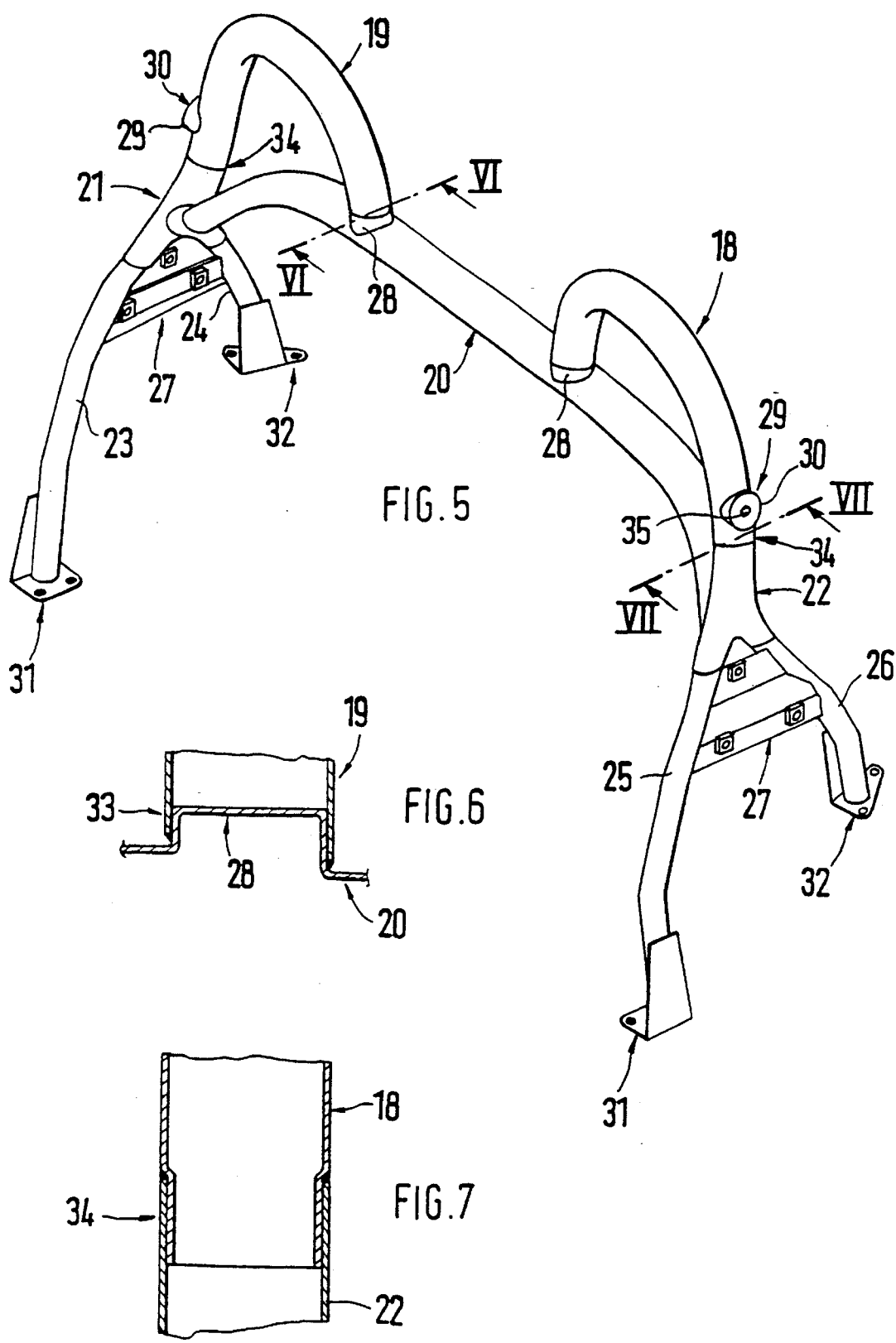

ROLLOVER BAR FOR A MOTOR VEHICLE

This application is a continuation of application Ser. No. 08/413,764 filed on Mar. 30, 1995 now abandoned.

BACKGROUND AND SUMMARY OF THE INVENTION

This invention relates to a rollover bar for a motor vehicle, particularly for a convertible, which comprises several mutually connected frame parts and is fastened on its laterally exterior lower ends to the stationary vehicle body.

From German Patent Document DE-GM 85 23 831, a convertible is known in which a rollover bar is arranged behind the front seats.

This rollover bar comprises two inversely U-shaped frame parts which are arranged behind the seats and which are fastened in the same plane situated at a distance side by side to a horizontal frame part.

In addition, this rollover bar comprises rear frame parts which act as supporting arms and which are fixedly connected with welded-on bushes of the U-shaped frame parts.

All frame parts of this rollover bar are formed by linear or bent steel tubes of a circular cross-section, each frame part having a constant cross-section along its whole longitudinal dimension.

This rollover bar has the disadvantage that the dimensioning of the tube cross-section of the frame parts must be adapted to the highest occurring stress so that the rollover bar is overdimensioned at least in partial areas, requires a lot of space and has a high weight because of the steel construction.

In addition, the weld seams between the horizontal frame part and the two U-shaped frame parts must alone transmit the occurring forces.

It is an object of the invention to further develop a rollover bar of the initially mentioned type in such a manner that, while its function is good, it can be manufactured in a simple manner and at reasonable cost, requires minimal mounting space, and has a low weight.

According to the invention, this object is achieved by providing a rollover bar arrangement comprising internal-high-pressure-formed frame parts.

Principal advantages achieved by means of the invention are that, by using internal-high-pressure-formed frame parts for the rollover bar, a rollover bar is provided whose changeable cross-sections are adapted to the occurring stresses and which therefore requires a minimal mounting space.

The internal-high-pressure-formed frame parts can be manufactured in a simple and low-cost manner. Because of the plug-type connections between adjacent frame parts, this rollover bar can withstand extreme stress. In addition, the bending stress in the weld seam is reduced by means of the plug-type connections which increases the safety of the component. As a result of the high-pressure deforming, the structure of the material will change and the component strength and the torsional stiffness will increase.

Any desired shape of the frame parts can be implemented and the space conditions are utilized to an optimal extent. Add-on parts can easily be integrated in the rollover bar because of the internal-high-pressure deforming.

The internal-high-pressure-formed frame parts have a high precision with respect to their shape and measurements so that their assembly is simple.

Other objects, advantages and novel features of the present invention will become apparent from the following detailed description of the invention when considered in conjunction with the accompanying drawings.

BRIEF DESCRIPTION OF THE DRAWINGS

FIG. 2 is an exploded view of the components of the first embodiment of the rollover bar;

FIG. 3 is an enlarged sectional view taken along Line III—III of FIG. 2;

FIG. 4 is an enlarged sectional view taken along Line IV—IV of FIG. 2;

FIG. 5 is an enlarged perspective diagonal view from the front to a second embodiment of the rollover bar, constructed according to the present invention;

FIG. 6 is an enlarged sectional view taken along Line VI—VI of FIG. 5;

FIG. 7 is an enlarged sectional view taken along Line VII—VII of FIG. 5; and

DETAILED DESCRIPTION OF THE DRAWINGS

For the protection of the occupants of a motor vehicle, particularly of a two-seat convertible, which is not shown in detail, a rollover safety device is provided behind the two front seats which is formed by a rollover bar 1.

The rollover bar 1 comprises several mutually connected hollow-profile-shaped frame parts 2, 3 and is fastened on its laterally outer lower ends by means of mounting plates 4, 5 on the stationary vehicle body.

According to the invention, it is provided that the rollover bar 1 comprises internal-high-pressure-formed frame parts 2, 3. Preferably, all frame parts 2, 3 of the rollover bar 1 are formed by internal-high-pressure-formed frame parts.

However, the possibility exists that at least individual frame parts 2, 3 are formed by linear or bent hollow-profile-shaped frame parts 2, 3 which have a uniform cross-section along their longitudinal dimension and are not internal-high-pressure formed.

Figure 1:
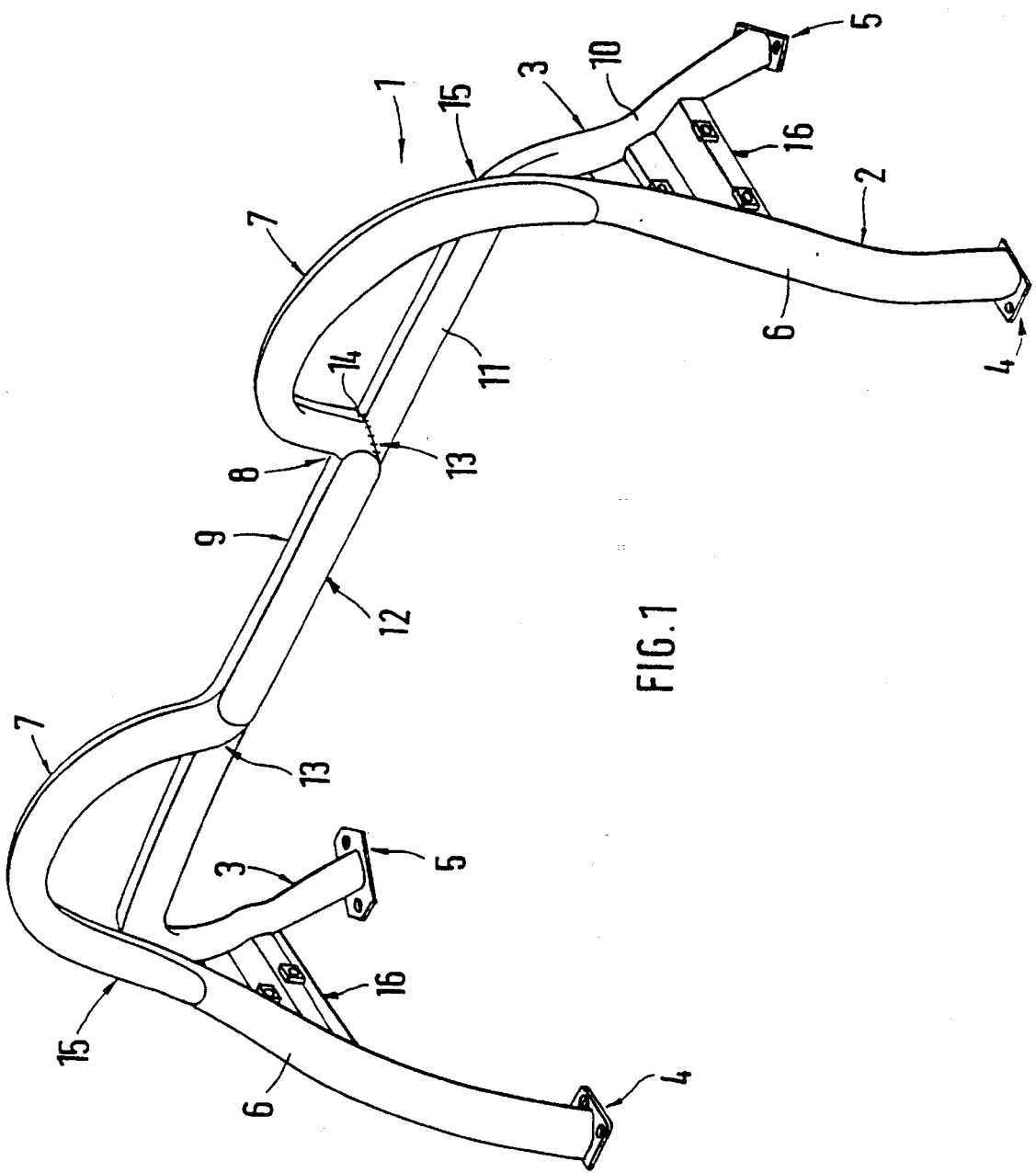
FIG. 1 is a perspective diagonal view from the front of a first embodiment of a rollover bar, constructed according to the present invention.
Figure 8:
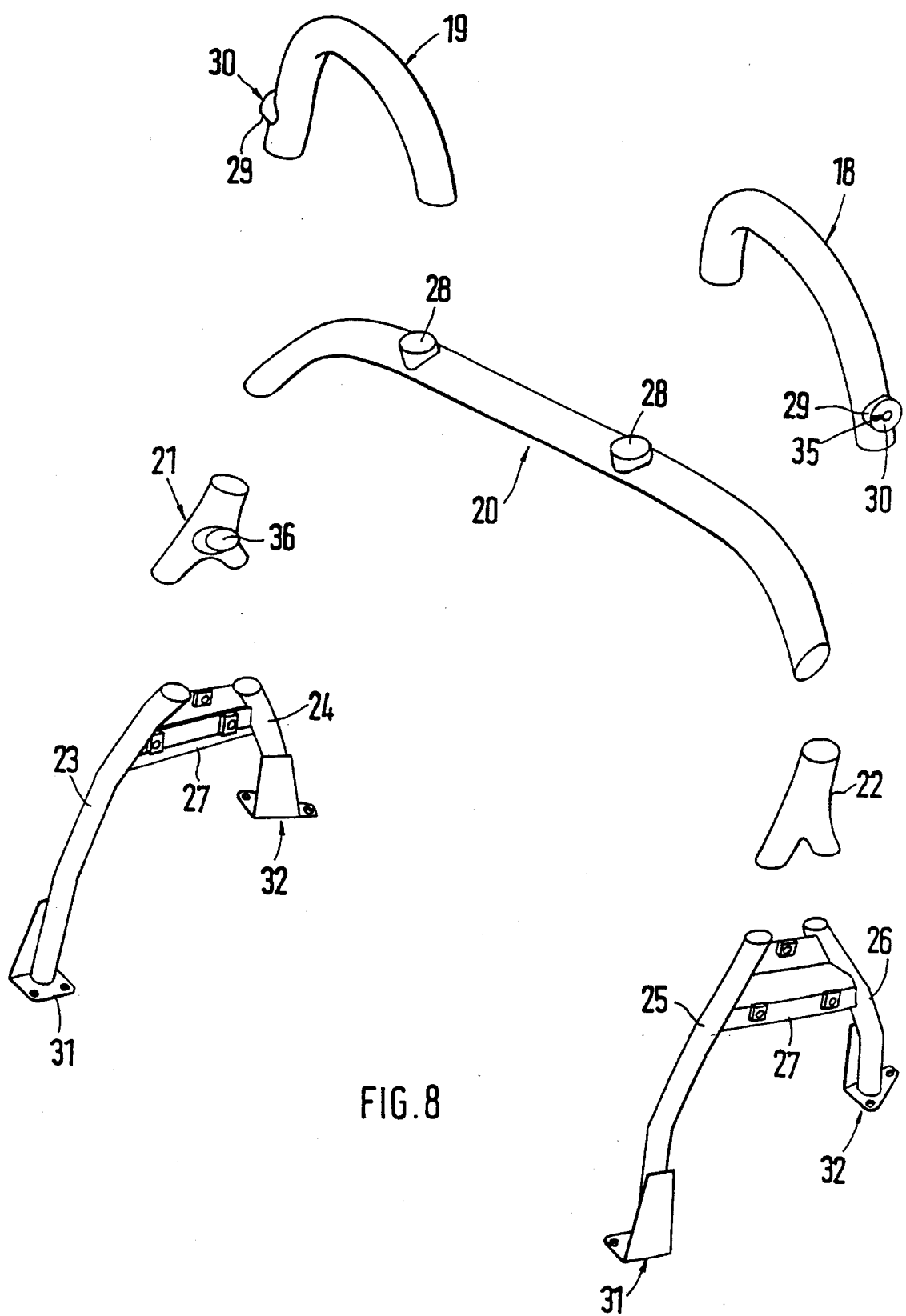
FIG. 8 is an exploded view of the frame parts of the second embodiment of the rollover bar.

The first embodiment of the rollover bar 1 illustrated in FIG. 1 comprises a bar-shaped forward frame part 2 constructed in one piece and two rearward frame parts 3 which act as supporting elements and are assembled to form a rigid frame construction.

For achieving a simpler manufacturing, the forward frame part 2 may comprise two halves which are fitted together in the area of the vehicle longitudinal center plane, in which case the two halves are either butt-jointed with respect to one another or are connected with one another by means of welding or soldering, or the two halves overlap one another in sections and are fitted into one another in a common connection area (not shown in detail).

Each half of the forward frame part 2 comprises a first upright section 6 which is adjoined by a bar-shaped second section 7, the bar-shaped section 7 changing on its interior end 8 into an approximately horizontally transversely extending third section 9.

The two rearward frame parts 3 are each composed of a longitudinally directed area 10 extending diagonally upward and to the front and a transversely extending area 11, in which case the rearward frame parts 3 are fitted into one another in a common connection area 12 and extend through the transversely extending section 9 of the forward frame part 2.

In the transition area of the bar-shaped second section 7 to the horizontal, transversely extending third section 9, the forward frame part 2 has openings 13 for the guiding-through of the rearward frame parts 3. In the area of the openings 13, the rearward frame parts 3 are connected with the forward frame part 2 by means of a surrounding weld 14.

In addition, the rearward frame parts 3 are welded locally, specifically in an exterior area of the bar-shaped sections 7, at reference number 15 to the forward frame part 2. For this purpose, flattenings may be locally provided on one or on both frame parts 2, 3, on which flattenings the frame parts 2, 3 contact one another.

Below this welded connection, one plate-shaped console 16 respectively is provided which extends in the longitudinal direction between each rearward frame part 3 and the forward frame part and which is fixedly connected with the two frame parts 2, 3.

The console 16 may be constructed as a flat or profiled plate and is used, on the one hand, for stiffening the rollover bar 1 and, on the other hand, for connecting add-on parts.

In the central connection area 12, the rollover bar 1 is in sections constructed in many layers (three or four hollow cross-sections disposed within one another) and can therefore withstand high stress.

On the side facing the occupants, sections of the forward frame part 2 are provided with a cushioning 17 which is connected with the forward frame part 2. This may take place by means of snapping, screwing or the like. The internal-high-pressure-formed frame parts 2, 3 have variable cross-sections and straight or bent longitudinal axes along their longitudinal course. The cross-sections are adapted to the occurring stress and may have any shape (for example, oval, elliptical, or the like).

The second embodiment of the rollover bar 1 illustrated in FIG. 5 comprises more components than the first embodiment and consists of frame parts 18 to 26 and of two consoles 27, all frame parts 18 to 26 being formed by internal-high-pressure-formed frame parts.

The frame parts 18, 19 are formed by two bar sections which are fixedly connected on their one end with frame part 20 constructed as a transverse tube. In addition, frame parts 18, 19 and 20 are connected to the knot-element-shaped frame parts 21, 22. Two additional frame parts respectively 23, 24 and 25, 26 lead away from each knot-element-shaped frame part 21, 22 and are constructed as forward and rearward support feet.

All frame parts 18 to 26 are in sections fitted into one another in common connection areas and are, in addition, connected with one another by gluing, welding, soldering or the like.

Locally upward-directed bulges 28 are provided on the frame part 20 for connecting the bar-shaped sections 18, 19 disposed above them, the ends of the frame parts 18, 19 being pushed onto the bulges 28 (form-locking connection).

On the outer sides of the frame parts 2 and 18, 19, bulges 29 with connecting surfaces 30 are also provided locally on which add-on parts, such as sash guides, or the like, can be fastened. Threaded bores 35 or weld nuts are provided in the area of the connecting surfaces 30 for the fastening of the add-on parts.

Mounting plates 31, 32, which are screwed to the adjoining vehicle body, are also mounted on the lower ends of the frame parts 23, 24, 25 and 26.

In the connection areas 34, the approximately Y-shaped frame parts 21, 22 reach around lower ends of frame parts 18, 19. Upper ends of frame parts 23, 24, 25 and 26 are fitted into connection piece sections of frame parts 21, 22. On the side facing frame part 20, both frame parts 21, 22 also have one bulge 36 respectively onto which an end area of frame part 20 is pushed.

In the starting condition, the individual frame parts 2, 3 and 18 to 26 of the rollover bar 1 are formed by straight cylindrical tube blanks which have a constant cross-section along their longitudinal dimension. The cross-section of the tube blank may be circular, oval, triangular or square, the tube blanks being constructed of light metal.

The tube blanks of a defined length will then be roughly prebent and placed into a multi-part nest tool and will then be brought into the desired final shape by means of an internal-high-pressure deformation. In the final form, the frame parts have a cross-sectional shape which is variable from the starting condition.

After the manufacturing of the individual frame parts 2, 3 and 18 to 26, these are fitted into one another and are additionally connected with one another by means of gluing, welding, soldering or the like. Furthermore, the mounting plates 4, 5 and 31, 32 are fastened to the lower ends of the frame parts 2, 3 and 23 to 26 (for example, by means of welding) and the longitudinally extending consoles 16 and 27 are connected with the frame parts 2, 3 and 23 to 26.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Rollover bar assembly for a motor vehicle, comprising:
    a plurality of tubular frame parts connected together, including tubular frame parts having lower ends adapted to be fastened in use to stationary vehicle body structure,
    wherein at least one of the tubular frame parts exhibits a varying cross-sectional configuration along its length including a minimum tubular internal cross-sectional dimension section and at least one further larger internal cross-sectional dimension section having greater component strength and torsional strength than said minimum cross-sectional dimension section, said at least one further larger internal cross-sectional dimension section being formed by internal high pressure forming of said at least one tubular frame part.

2. Rollover bar assembly according to claim 1, wherein all of said tubular frame parts of the rollover bar assembly have varying cross-sections along their length at positions spaced from respective end portions joined to other of said frame parts.

3. Rollover bar assembly according to claim 2, wherein the tubular frame parts of the rollover bar assembly are fitted into one another in sections in common connection areas and are also connected with one another by means of one of gluing, welding, and soldering.

4. Rollover bar assembly according to claim 1, wherein the tubular frame parts of the rollover bar assembly are fitted into one another in sections in common connection areas and are also connected with one another by means of one of gluing, welding, and soldering.

5. A rollover bar assembly according to claim 1, wherein said tubular support frame part members include two tubular frame part members at each lateral end of the central section, said two tubular frame part members being spaced longitudinally from one another at respective bottom ends adapted to be mounted at a vehicle body and terminating adjacent one another at respective upper ends at connections with the central section adjacent a respective lateral end of an associated respective U-shaped tubular frame part member.

6. A rollover bar assembly according to claim 5, wherein at least some of said tubular frame part members of the rollover bar assembly are fitted at respective ends into either of said tubular frame part members at common connection areas, said tubular frame part members being also connected with one another by means of one of gluing, welding, and soldering.

7. Rollover bar assembly for a motor vehicle, comprising:
   a central tubular section formed of at least one tubular frame part member,
   tubular support frame part members connected to the central section and extending substantially perpendicular to said central section, said support frame part members having lower end sections adapted to be mounted to a vehicle body, and
   a pair of transversely spaced downwardly open U-shaped tubular frame part members fixed to the central section and extending vertically above said central section to form top portions of said rollover bar assembly.

8. A rollover bar assembly according to claim 7, wherein said central section includes upwardly protruding bulges which are transversely spaced from one another, and
   wherein one leg respectively each of the U-shaped tubular frame part- members is fitted onto a respective one of said bulges.

9. A rollover bar assembly according to claim 8, wherein a respective console in the form of a plate is connected to upward portions of each of said tubular support part frame members adjacent a connection with the central section, at each lateral end of said central section.

10. A rollover bar assembly according to claim 7, wherein each of said tubular frame part members exhibits a varying cross-section along its length intermediate its ends, which varying cross-section is formed by internal high pressure forming of the respective tubular frame part member.

11. A rollover bar assembly according to claim 7, further comprising cushioning attached to an outer periphery of at least one of said tubular frame part members.

12. A rollover bar assembly according to claim 7, further comprising a reinforcement console in the form of a plate for stiffening the rollover bar assembly and for facilitating connecting of add-on parts.

13. A rollover bar assembly according to claim 12, wherein a respective one of said consoles is provided at each lateral end of the central section.

14. Convertible vehicle rollover bar assembly comprising:
   a first internal high-pressure formed tubular frame part exhibiting a varying cross-sectional configuration along its length, including a minimum tubular internal cross-sectional dimension section and at least one further larger internal cross-sectional dimension section having greater component strength and torsional strength than said minimum cross-sectional dimension section, said at least one further larger internal cross-sectional dimension section being formed by internal high pressure forming of said at least one tubular frame part,
   and a second internal high-pressure formed tubular frame part exhibiting a varying cross-sectional configuration along its length including a minimum tubular internal cross-sectional dimension section and at least one further larger internal cross-sectional dimension section having greater component strength and torsional strength than said minimum cross-sectional dimension section, said at least one further larger internal cross-sectional dimension section being formed by internal high pressure forming of said at least one tubular frame part,
   wherein said first and second tubular frame parts are fixedly connected to one another.

15. A convertible vehicle rollover bar assembly comprising a central section and support members connected to the central section and extending substantially perpendicularly to the central section,
   wherein the support members have end sections adapted to be mounted to a vehicle body,
   and wherein the central section has transversely spaced bulges on a top surface thereof and two generally U-shaped members fitted over respective ones of the bulges.

* * * * *